United States Patent
Karandikar et al.

(10) Patent No.: US 8,862,102 B2
(45) Date of Patent: Oct. 14, 2014

(54) METHOD FOR FACILITATING AND ANALYZING SOCIAL INTERACTIONS AND CONTEXT FOR TARGETED RECOMMENDATIONS IN A NETWORK OF A TELECOM SERVICE PROVIDER

(75) Inventors: Abhay Karandikar, Mumbai (IN); Animesh Kumar, District Saran (IN); Prateek Kapadia, Mumbai (IN); Sanjay Kumar, Pune (IN); Somya Sharma, Kanpur (IN); Dhanashree Deval Parakh, Miraj (IN)

(73) Assignee: TTSL IITB Center For Excellence In Telecom (TICET), Mumbai (IN)

( * ) Notice: Subject to any disclaimer, the term of this patent is extended or adjusted under 35 U.S.C. 154(b) by 411 days.

(21) Appl. No.: 12/906,057

(22) Filed: Oct. 15, 2010

(65) Prior Publication Data
US 2011/0201317 A1    Aug. 18, 2011

(30) Foreign Application Priority Data
Feb. 15, 2010  (IN) .......................... 411/MUM/2010

(51) Int. Cl.
*H04M 3/42*    (2006.01)
*H04W 4/20*    (2009.01)
*G06Q 30/02*   (2012.01)
*H04M 7/00*    (2006.01)
*H04L 29/08*   (2006.01)
*H04W 4/12*    (2009.01)

(52) U.S. Cl.
CPC ............. *H04M 7/0024* (2013.01); *H04L 67/04* (2013.01); *H04M 2203/655* (2013.01); *H04W 4/12* (2013.01); *H04M 3/42348* (2013.01); *H04W 4/206* (2013.01); *H04M 3/42382* (2013.01); *G06Q 30/02* (2013.01); *H04M 2207/18* (2013.01)
USPC ....................................................... 455/414.1

(58) Field of Classification Search
CPC ......... H04W 4/12; H04W 4/14; H04W 4/206; H04W 8/18; H04W 8/186; H04W 88/184
USPC ........ 455/414.1–414.4, 418–422.1, 456, 466, 455/550.1, 552.1, 553.1, 556.1, 556.2, 566; 370/310.2, 328, 338, 352–356; 707/705–788
See application file for complete search history.

(56) References Cited

U.S. PATENT DOCUMENTS

| | | | | |
|---|---|---|---|---|
| 2008/0255977 | A1* | 10/2008 | Altberg et al. | 705/35 |
| 2009/0177604 | A1* | 7/2009 | Alperin | 706/46 |
| 2009/0313555 | A1* | 12/2009 | Stovicek et al. | 715/753 |
| 2010/0064007 | A1* | 3/2010 | Randall | 709/204 |
| 2010/0081461 | A1* | 4/2010 | Bothra et al. | 455/466 |
| 2010/0268830 | A1* | 10/2010 | McKee et al. | 709/228 |
| 2011/0029887 | A1* | 2/2011 | Pearson et al. | 715/743 |

* cited by examiner

Primary Examiner — San Htun
(74) Attorney, Agent, or Firm — Rahman LLC

(57) ABSTRACT

A mobile social networking platform including a system and method for cellular communications and accessing services using cellular communications. The system and method enable any mobile device user having a mobile station (MS) with minimal functionality to SMS to access a social network without installing any additional software on the MS. The system and method also enable the mobile user to access Location Based Services even if the network provides location information, without specifically requiring a GPS/GPRS enabled MS.

17 Claims, 10 Drawing Sheets

METHOD FOR FACILITATING AND ANALYZING SOCIAL INTERACTIONS AND CONTEXT FOR TARGETED RECOMMENDATIONS IN A NETWORK OF A TELECOM SERVICE PROVIDER

FIELD OF INVENTION

This invention relates to cellular communications, and more particularly to accessing services using cellular communications.

BACKGROUND OF INVENTION

Social interaction between groups of people who share a common interest is aptly captured by a "social network". Popular social networks, for example Facebook and Orkut, connect people by using interdependencies such as friendship, kinship, school or college, hobbies, etc. It is generally believed and it is reasonable to assume that the value of a social network grows with the number of users.

A social network accessible by the use of a mobile-phone is referred to a mobile social network. Participants in the mobile social network are consumers of a telecommunication service provider, and hence the social interactions may include additional social information, such as call records and subscriber profile.

The idea driving the mobile social network application is that targeted or social information should be made available to the mobile users "on the fly". Mobile social network services are broadly classified into two types: push and pull. In push type, the target information, such as points of interest (POI) in a geographical neighborhood of the user's current location is provided to the user by the application service-provider automatically. In contrast, in pull type the target information is requested by the user to the mobile social network service. Mobile social network services commonly include features such as (i) giving POI in a push type request by estimating user's current geographical location and (ii) giving a suggested list of friends in the neighborhood, in a pull type request.

Some mobile applications need to send information of interest to the mobile user, and also perhaps enquire about the user's preferences for certain information. People in the same social group tend to have similar preferences. Hence, applications would do well to use the mobile social network to determine user's preferences from the preferences of their peers in the social network. Further, the information itself may be clustered into "groups", such that a user's preference for information in a particular group indicates likelihood for her preference for information in the cluster. Thus, the social network of users and the information clusters can be used in tandem to match relevant information to interested users.

Systems which suggest or have proposed to suggest POI to a mobile user near its location include AT&T, Whrrl, Buzzd, and Loopt. Among all these systems, Whrrl allows its users to rate POI in its cities. There are also services that focus on connecting socially related users. For example, Brightkite offers services to registered users to connect with their existing friends at other social networking websites and also to meet new people based on the geographical location. The above mentioned solutions depend on the mobile user having an internet access means on his Mobile Station (MS).

SUMMARY OF INVENTION

Embodiments herein disclose a method and system for providing targeted recommendations about an event to a user in a social network, wherein the social network is accessible from a mobile device in a mobile network using Short Messaging Service, the method comprising of the step of providing recommendations about the event to the user based on a plurality of factors, the factors comprising of at least one of relationship of the user with a social cluster; relationship of the event with an event cluster; relationship of the social cluster with the event cluster; and ratings provided by a plurality of users for a plurality of events in the event cluster, wherein the user may be included in the plurality of customers. The event cluster is created by performing steps of fetching event attributes of the event from an event database; analyzing the event attributes to build a list of events with similar attributes; and grouping the list of events into the event clusters. The event attributes comprise of at least one of keywords, suitable user profiles, and location. The social cluster is created by performing steps of analyzing the feedback and the rated events, where the rated events are similar to the event, to build a list of users with similar interests; and grouping the list of users into a social cluster. The social cluster is modified by performing steps of analyzing Call Detail Records of the user, list of contacts of the user, profile of the user, location of the user, the feedback and the rated events, where the rated events are similar to the event; and re-grouping the social cluster. Analyzing rated events further comprises steps of fetching users who have rated events, wherein the events are of interest to the user; and quantifying interest of the users on the social network. Analyzing Call Detail Records further comprises steps of assigning weights to entries present in the Call Detail Records; and ranking the entries based on the weights, where the weights are assigned based on similarity of interests between the user and the entries. Analyzing list of contacts of the user further comprises steps of checking contacts of the user for contacts who have similar interests as the user; and quantifying influence of contacts with similar interests on the user. The attributes of the social clusters may be dynamically defined or dynamically defined by a third party. Providing recommendations to a user further comprises at least one of the user providing feedback about the event; and the user providing ratings for the event and the feedback and the ratings are further used to modify the event clusters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
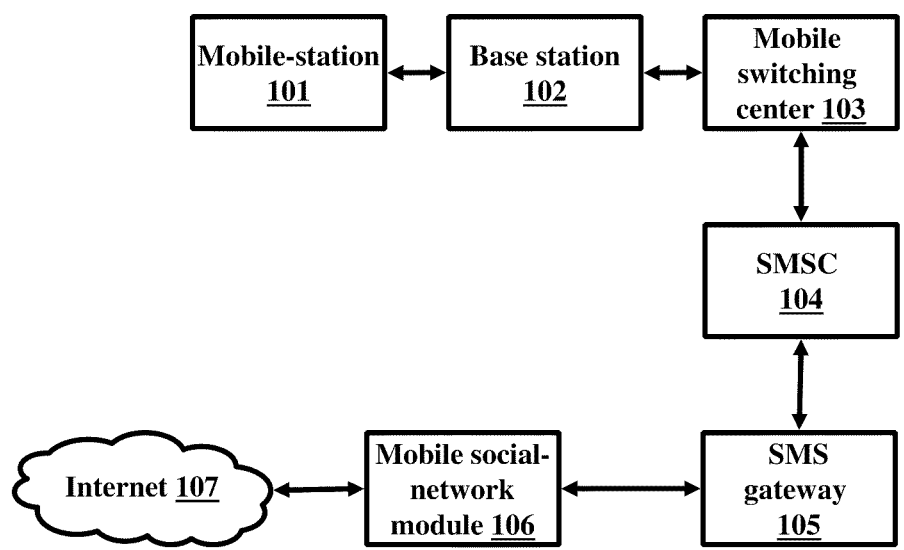
FIG. 1 depicts a telecom network architecture, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein enable any mobile user having a MS with minimal functionality of SMS to create and access a social network, without installing any additional software on the MS. Referring now to the drawings, and more particularly to FIGS. 1 through 10, where similar reference characters denote corresponding features consistently throughout the figures, there are shown preferred embodiments.

FIG. 1 depicts the telecom network architecture, according to embodiments as disclosed herein. The telecom network comprises of a MS 101, a base station (BTS) 102, a mobile switching center (MSC) 103, a SMS center (SMSC) 104, a short messaging service (SMS) gateway 105, and a mobile social network module (MSNM) 106. The mobile station (MS) 101 can be any mobile station which has SMS writing and receiving features present in it. The MS 101 provides the facility of sending and receiving SMS to the user. The BTS 102 provides the radio infrastructure necessary for wireless communication. The MSC 103 routes and switches traffic to and from the MS 101. The MSC forwards any SMS to the SMS center (SMSC) 104 which is a centralized store and forward server. The SMSC 104 passes on any SMS transactions to (and from) any other media to the SMS gateway 105. For example, a specific application like the proposed MSNM can have a predefined-number 55555 for enabling access from the MS. When an SMS is sent to this number, it is forwarded through the SMSC 104 and the SMS gateway 105 to the MSNM 106. The response, in an SMS form, from the MSNM 106 to the MS 101 is sent back via the SMS gateway 105 and SMSC 104. The SMSC 104 is a centralized store and forward server. The SMSC 104 stores a copy of any SMS sent by a user for another (destination) user before forwarding it. Thus, each SMS gets stored in the SMSC 104 before delivery to the destination user (whenever the user may be available). The SMSC is also responsible for checking the account status (or, whether the account is valid for receiving SMS) of the intended recipient.

The MSNM 106 is also connected to the internet 107 for possible interoperability between the proposed application and existing social networking applications.

The MSNM 106 can facilitate any social interaction among different users, provide socially-aware or geographically-aware services, and provide commercial services.

The MSNM 106 enables users to create, edit, or cancel user-groups by sending commands through messages (for example, SMS). Each user can add some friends forming a buddy list. Each user can perform 'social activities' such as write messages to buddies, suggest groups to buddies, control privacy to reveal information, update current status, share calendar information, and so on.

The MSNM 106 further enables users in the proposed mobile social network to interact with the server. For example, the user can receive services that use location-based information such as query a list of POI in pull-type request. The user can also get targeted recommendations on commercial or non-commercial products in push or pull type requests. The user can also request to export (or import) buddy-list (or similar information) from other social networking applications.

The MSNM 106 uses client-server architecture to maintain the information in a database. The server comprises of a number of components including the telecom network, databases, and application programmable interface. The clients comprise of the interface of the MSNM 106, the internet 107, and the MS 101. A potential user can either send an SMS to a pre-defined number or visit the website of the proposed mobile social network. By these two methods, the user can sign up for the social network service, and add buddies to his or her network.

Figure 2:
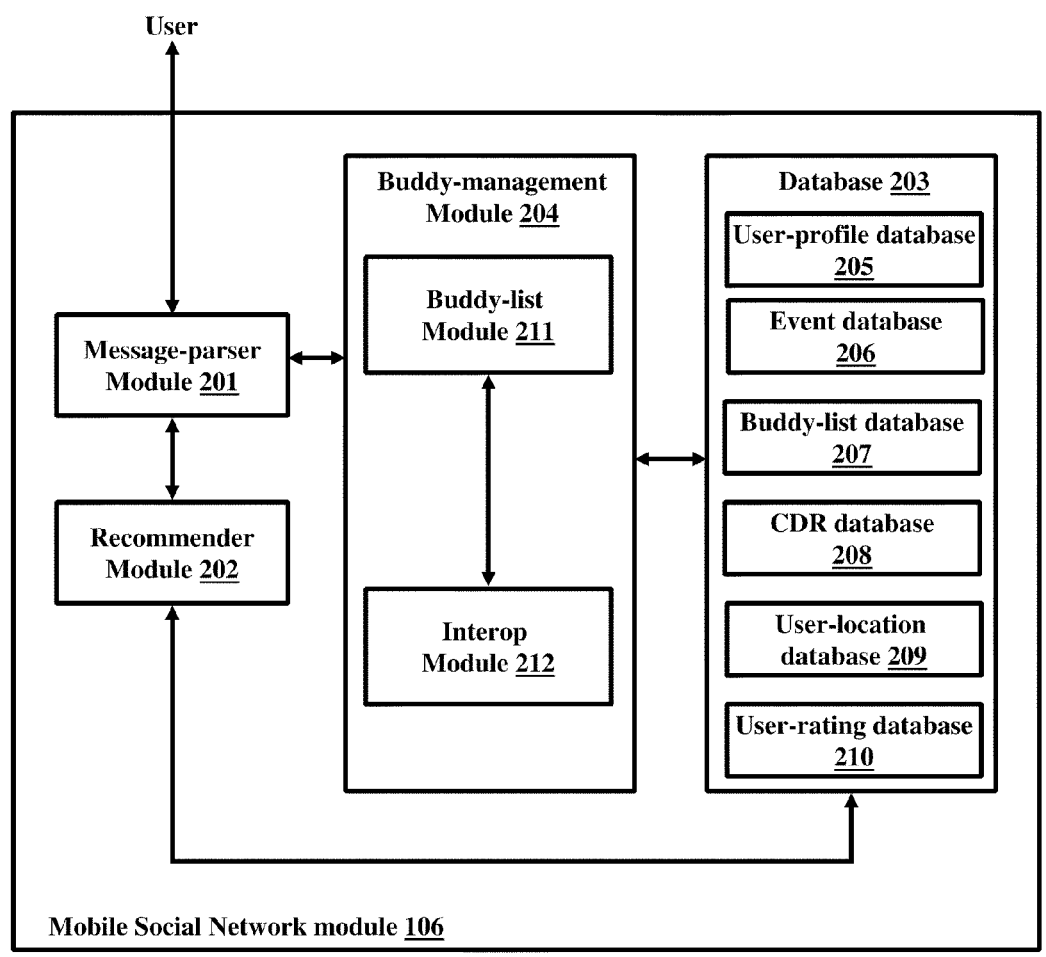
FIG. 2 depicts the organization of MSNM, according to embodiments as disclosed herein.

FIG. 2 depicts a MSNM, according to embodiments as disclosed herein. The MSNM 106 comprises of a message-parser module 201, a recommender module 202, a database 203 and a buddy-management module 204. The database 203 further comprises of various databases such as a user-profile database 205, an event database 206, a buddy-list database 207, a call-data record (CDR) database 208, user-location database 209, and a user-rating database 210. The buddy management module 204 further comprises of a buddy list module 211 and an interop module 212.

The message-parser module 201 receives the query sent by the user, interprets it, and forwards it to the various components of the MSNM according to the query request. For example, an SMS query made by a user from a MS 101 comes to the message-parser module 201 via the SMS gateway 105. Similarly, when any component of the MSNM has to send or return information to a query, the respective component sends the information via the message-parser module 201. For example, the message-parser module can send this information as an SMS to the respective user, via the SMS Gateway 105. Consider a user-A, who wants to add another user-B with mobile-number mobileNumber. If user-A wants to add user-B as his or her buddy, user-A can send the following SMS to the predefined number of the MSNM.

ADD MobileNumber

The message-parser module 201 will identify the command ADD and forward this request to the buddy-list module 211 to add user-B in the buddy-list of user-A. Subsequently, this will also result in an update of the buddy-list database 207.

Similarly, if a user wants to get targeted recommendation on the topic recoKeyword above a rating threshold ratingThreshold, the user can send the following SMS to the predefined number of the MSNM.

RECO RecoKeyword RatingThreshold

The message-parser module 201 will identify the command RECO and forward this request to the recommender module 202. Similarly when any module has to provide targeted recommendation, the module forwards this request to the message-parser module 201, which can further convert this information in an SMS and send it to the MS 101 through the SMS gateway 105.

The recommender module 202 can be used to provide targeted recommendations, both commercial and non-commercial, to a user. The targeted recommendations can utilize the demographic profile such as name, age, gender, etc. present in a user-profile database with the telecom service-provider. Any commercial and non-commercial enterprise can register with the service provider to advertise their product, schemes, or events to mobile users. The recommender module 202 may filter users according to the specific profile requirements of the advertisement. For example, if an organization wants to hire students in the age range of 18-22, then the recommender module 202 can filter a list of appropriate users by using the user-profile database. Similarly the user-profile can be used to announce or advertise local (social) events such as exhibitions, cultural activities, awareness programs, election campaigns etc. In general, the recommender module 202 can utilize the information present in the user-profile database 205, event database 206, buddy-list database 207, CDR database 208, user-location database 209, and user-rating database 210 to make targeted recommendations.

The database 203 comprises of relational databases. The database 203 comprises of a user-profile database 205, an event database 206, a buddy-list database 207, a CDR database 208, user-location database 209, and a user-rating database 210.

The user-profile database 205 is maintained and monitored by the telecom service provider, which contains the registration information of each user. Information such as such as the age, gender, and place of residence of a user is stored in the user-profile database 205.

A social event registered with the MSNM by any enterprise or a user will simply be called as an event and is stored in the event database 206. Every event is described by a set of keywords. Loosely speaking, these keywords can be thought of as 'tags'. Every event has its own set of keywords describing the event. For example, keywords associated with the book Harry Potter and the Goblet of Fire can be book, Harry Potter, J. K. Rowling, fiction, bestseller. The keywords may be defined in order of rank. In the above example, the keyword book has a higher rank compared to the keyword fiction. At the time of event registration, these keywords will be defined by the enterprise or the user registering it. The event database 206 comprises of all the events along with its ranked keywords. The demographic details such as name, mobile number, and the location of the enterprise or the user creating the event are also stored in the event database 206. If the event to be recommended has no specific location field it can be made applicable to all locations. The importance of the event's geographical location may also be specified in the event database 206.

Event clusters represent similarities between sets of events. An event cluster is created by analyzing event attributes such as keywords, suitable user profiles, and location. The grouping of events into event clusters is dynamic and updates to it are maintained to reflect changes in attribute values.

Social clusters represent similarities between sets of users. These are initially created by analyzing the user feedback and rating on events. These social clusters are then modified by analyzing CDR, buddy lists, location, profile, and new feedback and ratings of events.

The buddy-list database 207 contains the list of mobile buddies of each user (added using the ADD command). The buddy-list database 207 can be modified by the user by sending request (for example, by SMS) to the MSNM. For example, a user with email address emailAddress may register for the mobile social network by sending an SMS to the MSNM with the following command.

REG EmailAddress

The user can be verified by his mobile number. The set of all valid commands may be obtained on the MS 101 with mobile number mobileNumber by sending the following query to the MSNM.

CMD MobileNumber

The user will receive the list of commands in an SMS on the MS 101. Other examples of user commands (assuming that there is another user in the proposed mobile social network with a mobile phone number of mobileNumber) for are as follows: (i) ADD mobileNumber to add a user to the buddy-list, (ii) DEL mobileNumber to delete a user from the buddy-list (subsequently the user requesting deletion is also removed from the buddy-list of his or her removed buddy), (iii) ACC mobileNumber to accept a user's request to become buddies, and (iv) REJ mobileNumber to reject a user's request to become buddies. To facilitate acceptance and rejection of buddies, a pending request list is maintained by the MSNM, where pending buddy-requests are stored. It must be noted that these commands are examples of how the MSNM can be used, and by no means limits functions that can be implemented in the proposed module.

Figure 3A:
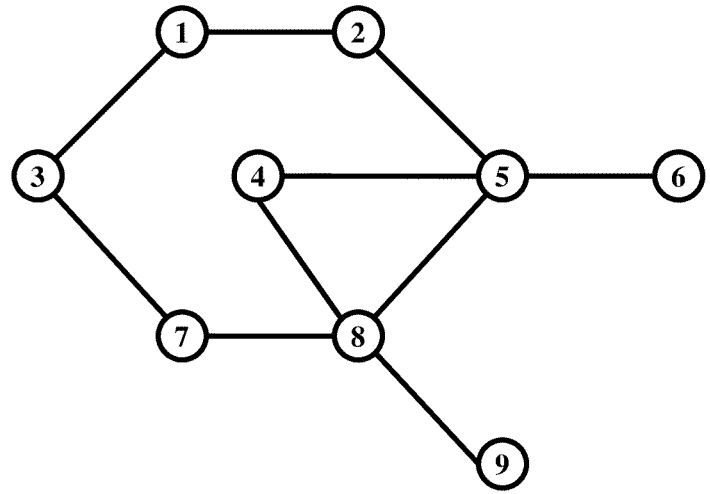
FIGS. 3(a) and 3(b) depict two graphs where the first and second graphs have one and two connected components of mobile social network users, respectively, according to embodiments as disclosed herein.
Figure 3B:
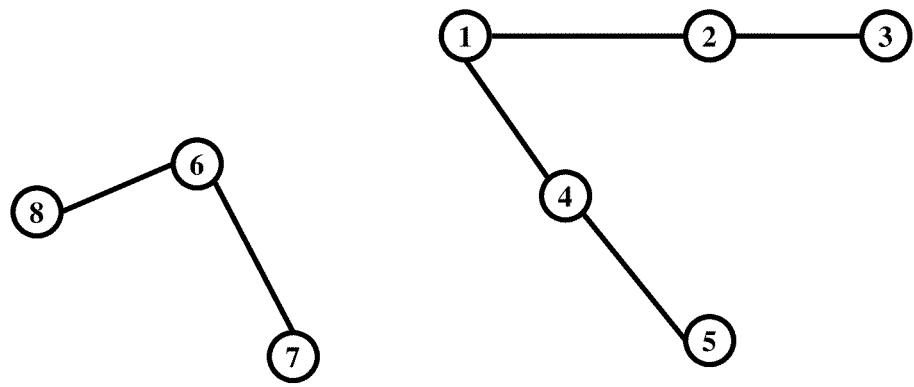
Figure 4:
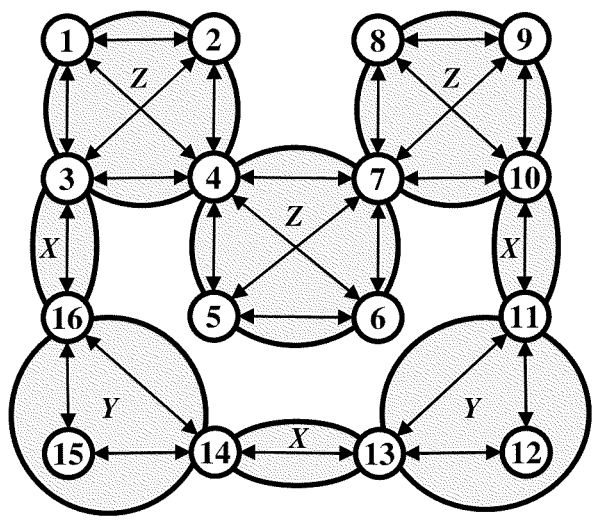
FIG. 4 illustrates an example of a graph of connected users with cliques of size two, three, and four, according to embodiments as disclosed herein.

Apart from the user-profile information, the telecom service providers gather information about user's call and messaging history marked with timestamps. This data is typically stored in a CDR database 208 and it can be used by the proposed MSNM to analyze social relationships and dependencies. In general, any probabilistic or graph-theory based algorithm can be used to form these relationships. For example, the CDR database can be used to form a connectivity graph of users, as depicted in FIGS. 3(a) and 3(b), which can be further analyzed for connected components, i.e., a directed sub-graph where there is a path from each user (vertex) in the sub-graph to every other user (vertex). Basic examples which illustrate graph connectivity are explained next with the use of figures. In FIG. 3(a), a graph that is fully connected is illustrated, while in FIG. 3(b), a graph that has two connected components is illustrated. A sub-graph of users with bidirectional edges between each pair of users is called as a clique. Cliques of users in a social network are an example of strongly connected group of users. In FIG. 4, cliques of size two, three, and four are denoted as X, Y, and Z, respectively. This information can be used by the recommender module to provide targeted recommendations to the user. The CDR database 208 is usually monitored and updated by the telecom service provider.

The location of the user is stored in the user-location database 209. The location of the user may be obtained by the service provider using a suitable means. The location of the user may also be obtained using Global Positioning System (GPS). The user-location database 209 is updated whenever information is requested by the buddy-management module 204 or recommender module 202. The user-location database 209 also comprises of privacy settings for user's location visibility. Using these privacy settings, a user can choose to make his or her location inaccessible to the users of the proposed mobile social network.

The user-rating database 210 comprises of all the ratings submitted by users for different events. Using the recommender module 202, if necessary, ratings can be estimated and stored for any or every pair of user and event.

The buddy-management module 204 comprises of a buddy-list module 211 and interop manager 212. The buddy-management module 204 enables the users to perform buddy-list management operations. For example, a user can perform addition, deletion, or rejection operations in his or her buddy-list by using the buddy-management module. It also facilitates the organization of buddies into groups and monitoring of their content. The buddy-management module 204 can be accessed by sending queries to the message-parser 201.

The Interop module 212 facilitates the users to share profile and profile-related data across multiple social network applications and websites. The sharing of profile and profile-related data with any social network application may be done by using the internet 107. Using the application program interface (API) of any third-party social network services, the Interop manager 212 can import and export buddy-list by using identification information like the email id. Any users in the buddy-list obtained from the third-party social network services, which are not present in the user-profile database 205 of the proposed mobile social network, will be sent an invitation with a request to join the proposed mobile social network. Further, if needed and if supported by the API of a third-party social network, the Interop manager 212 can also have the facility for communicating with the buddies on a third-party social network.

Figure 5:
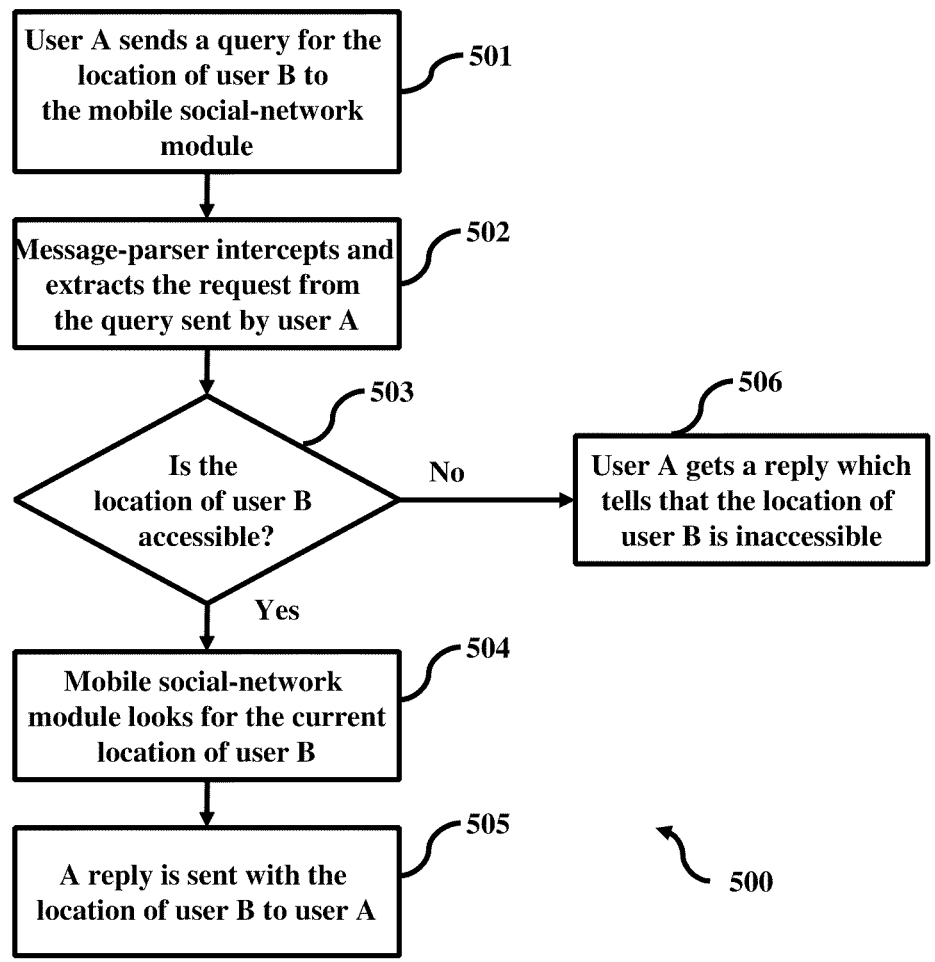
FIG. 5 depicts a flowchart with a process that enables a user A to find the location of a friend (say user B) in the proposed mobile social network by only sending an SMS, according to embodiments as disclosed herein.

FIG. 5 depicts a flowchart with a process that enables a user A to find the location of a friend (say user B) in the proposed mobile social network by only sending an SMS, according to embodiments as disclosed herein. Let there be a user-A who wants to know the (possibly approximate) location of his or her buddy user-B. User-A will send a request for the location of user-B (for example, by writing an SMS) to the message-parser 201. This action is captured in the block 501 of FIG. 5. The message-parser 201 extracts (502) the command from the query sent by user-A and checks (503) whether the privacy settings of user-B allow for the access to user-B's location. If user-A is permitted to view user-B's location, then the buddy-list module 211 searches (504) the database for user B's current-location available with the service provider. The reply to the request of user-A is sent via the message parser 201 (505). If user-A does not has the permission to view the location of user-B, then the message parser 201 sends a reply that the location of user-B is inaccessible (506). The various actions in method 500 may be performed in the order presented, in a different order or simultaneously. Further, in some embodiments, some actions listed in FIG. 5 may be omitted.

Figure 6:
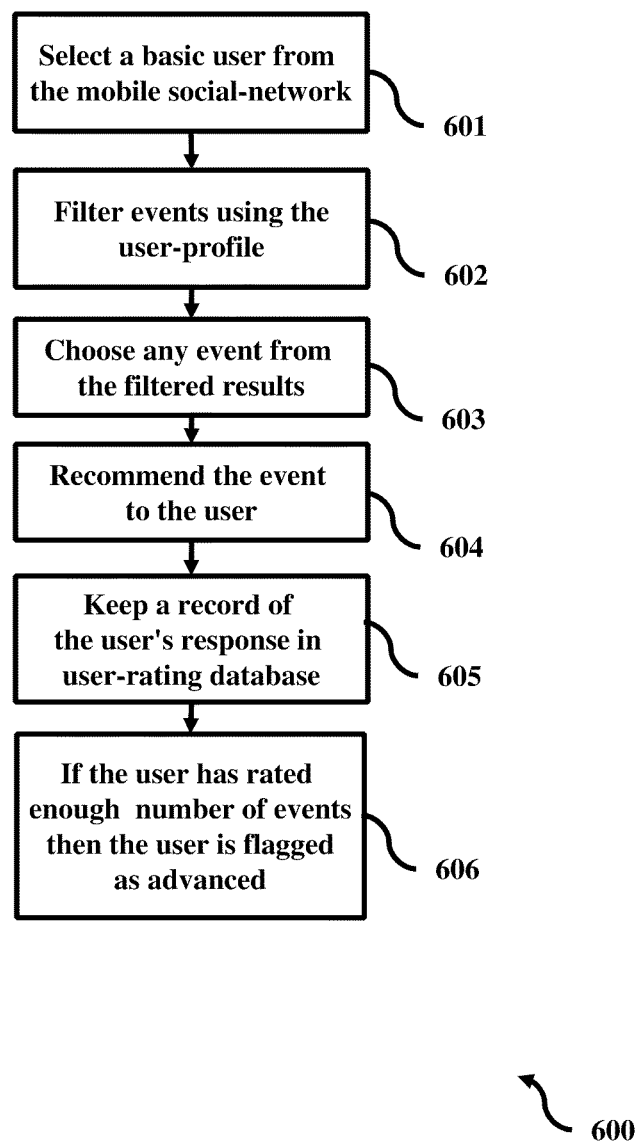
FIG. 6 depicts a flowchart with a process in which the proposed MSNM selects a user flagged as 'basic' and performs some steps to learn the user's social interests, according to the embodiments as disclosed herein.

FIG. 6 depicts a flowchart with a process in which the proposed MSNM selects a user flagged as 'basic' and performs some steps to learn the user's social interests, according to the embodiments as disclosed herein. When a new user joins the proposed mobile social network, he or she is flagged as basic. Till the user has rated a certain (threshold) number of events, the user is considered as basic. Once the user provides ratings for the threshold number of events, the user is flagged as advanced. The recommender module 202 selects (601) a basic user, hereinafter referred to as user-A, from the proposed mobile social network. The recommender module 202 filters (602) events according to the user-profile of user-A, and chooses (603) an event from the filtered results. The event may be chosen randomly. The recommender module 202 recommends (604) this event to the user-A. The recommender module 202 sends a query to the user-A for the rating of this event. A record of event-ratings from user-A are maintained in the user-rating database (605). Over time, if user-A has rated a certain number of events, then the recommender module 202 sets the flag of user-A as advanced. The various actions in method 600 may be performed in the order presented, in a different order or simultaneously. Further, in some embodiments, some actions listed in FIG. 6 may be omitted.

Figure 7:
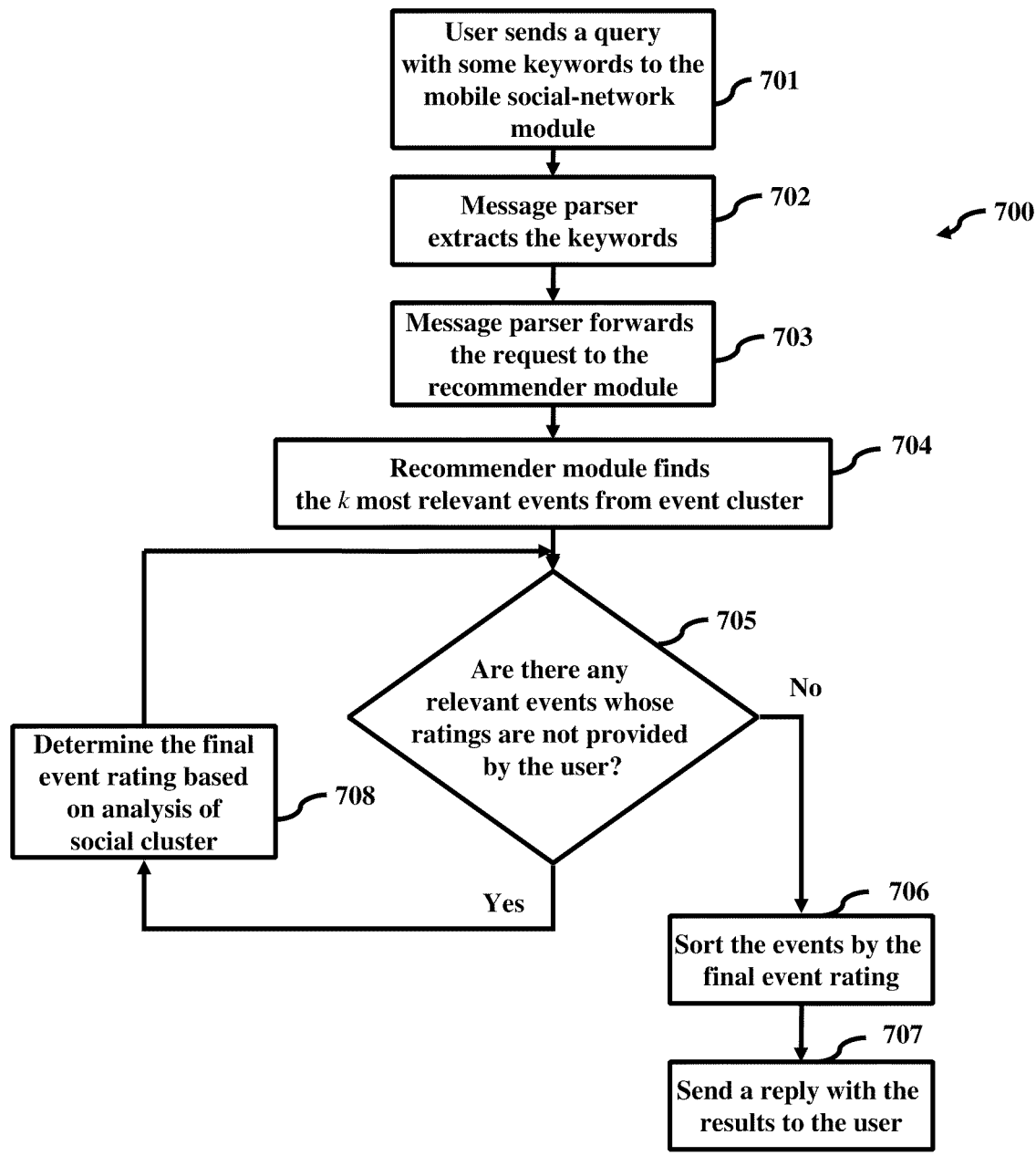
FIG. 7 depicts a flowchart with a process where a user can send keywords to query for recommendations (pull-type) from the MSNM, according to embodiments as disclosed herein.

FIG. 7 depicts a flowchart with a process where a user can send keywords to query for recommendations (pull-type) from the MSNM, according to embodiments as disclosed herein. For getting (targeted) recommendations, a user sends (701) a non-empty set of keywords as a query (for example, by an appropriate SMS) to the mobile social network module 106. The message-parser 201 extracts (702) the keywords, and forwards (703) these keywords as an appropriate command to the recommender module 202. Based on the keywords sent by the user and the set of events present in the event database 206, the recommender module 202 filters (704) out k most relevant events. This may be found out by using suitable information retrieval techniques like latent semantic indexing or probabilistic ranking principle. The integer parameter k can be kept fixed or flexible. The recommender module 202 first checks (705) if the user who sent the query with keywords has not rated (or provided feedback for) any event among the k events. The recommender module 202 determines (708) the final user-rating for the events depending on the social cluster. If there are (705) any more relevant events, step 708 is repeated for each event. If there are no more relevant events, then the recommender module 202 sorts (706) all the events in order of the estimated ratings. The events may be sorted by rating (ascending or descending), timestamp, alphabets, or any other appropriate order. The recommender module 202 replies (707) with the results to the user (for example, via the SMS gateway 104 using an SMS). The results may comprise of the name of the events, location and the phone numbers etc. The various actions in method 700 may be performed in the order presented, in a different order or simultaneously. Further, in some embodiments, some actions listed in FIG. 7 may be omitted.

Figure 8:
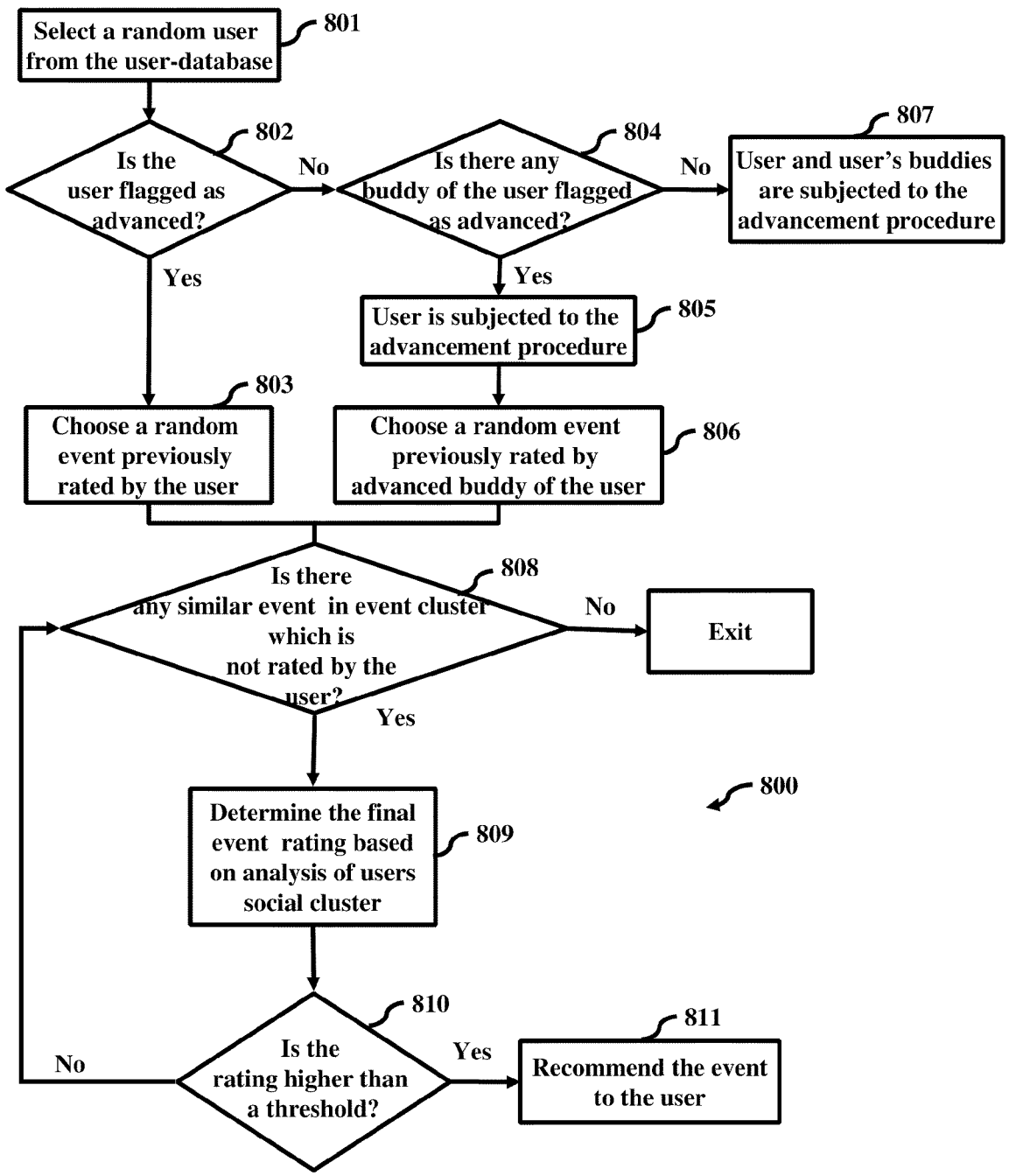
FIG. 8 depicts a flowchart with a process where a user gets a targeted-recommendation (push-type) from the MSNM, according to embodiments as disclosed herein.

FIG. 8 depicts a flowchart with a process where a user gets a targeted-recommendation (push-type) from the MSNM, according to embodiments as disclosed herein. Consider a random user, hereinafter referred to as user-A, who is present in the proposed mobile social network. The mobile social network module 106 can send targeted recommendations on events related to the past activities of this user. The recommender module 202 selects (801) a random. First, the algorithm checks (802) if user-A is flagged as advanced. If user-A is not flagged as advanced, then the recommender module 202 selects (804) the buddies of user-A from the buddy-list database 207. If none of the buddies of user-A are flagged as advanced, then the advancement procedure is carried out (807) on the buddies of user-A and the recommender module does not makes any targeted-recommendation. If the user-A is not flagged as advanced, but at least one of his buddies is flagged as advanced, then user-A is subjected (805) to the advancement procedure. A random event rated by one of the user's buddy, who is flagged as advanced, is selected (806). If user-A is flagged as advanced, then the recommender module selects (803) a random event previously rated by user-A. If the user-A or one of the buddies of user-A is flagged as advanced, then the recommender module 202 selects (806) a random event previously rated by at least one advanced buddy of the user-A. The recommender module 202 then finds (808) similar events by using the keywords used to describe these events. If there are no similar events, the recommender module 202 does not make any recommendation. Otherwise, the recommender module 202 determines (809) the rating for the event based on the analysis of the users' social cluster. If the obtained rating is higher than a (flexible) threshold (810), then the event is recommended to the user-A (811). If not, then remaining events in (808) are subjected to the procedure (808)-(811). The various actions in method 800 may be performed in the order presented, in a different order or simultaneously. Further, in some embodiments, some actions listed in FIG. 8 may be omitted.

Figure 9:
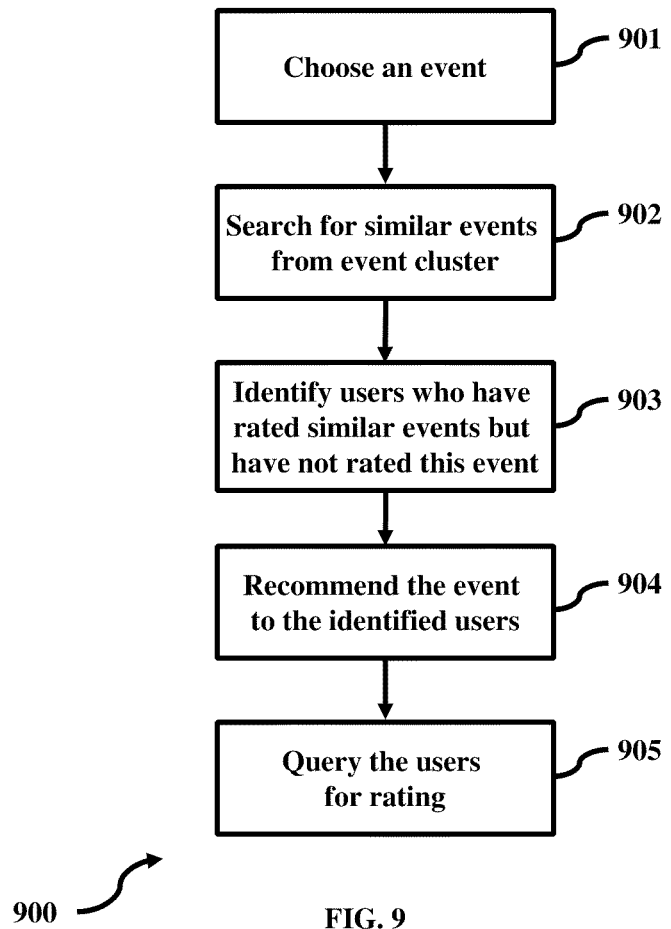
FIG. 9 depicts a flowchart where a user can be selected and queried for rating an event (push-type) by the MSNM, according to embodiments as disclosed herein.

FIG. 9 depicts a flowchart where a user can be selected and queried for rating an event (push-type) by the MSNM, according to embodiments as disclosed herein. Whenever there is a new event added to the event database 206, the recommender module 202 can identify the users who have shown interest in similar events based on the previous user-ratings and they can be queried for a rating the new event. For example, if a new book is added as an event, then the recommender module 202 will identify the users who have shown interest in books based on previous user-ratings and these users would be queried for providing user-rating. In this manner, the recommender module 202 can gather user-ratings for new or unrated events. The recommender module 202 selects (901) the event to be rated, hereinafter referred to as event-E. The event-E may be chosen randomly or it may be an event with no ratings. The recommender module 202 searches (902) for events which are similar to the event-E. Similar events may be identified using keywords associated with the events. The recommender module 202 identifies (903) users who have rated similar events but not rated event-E. The recommender module 202 recommends (904) the event-E to users who have not rated event-E, but have rated similar events. The recommender module 202 sends (905) a query (for example using an SMS through SMS gateway 105) to the identified users. The various actions in method 900 may be performed in the order presented, in a different order or simultaneously. Further, in some embodiments, some actions listed in FIG. 9 may be omitted.

Figure 10:
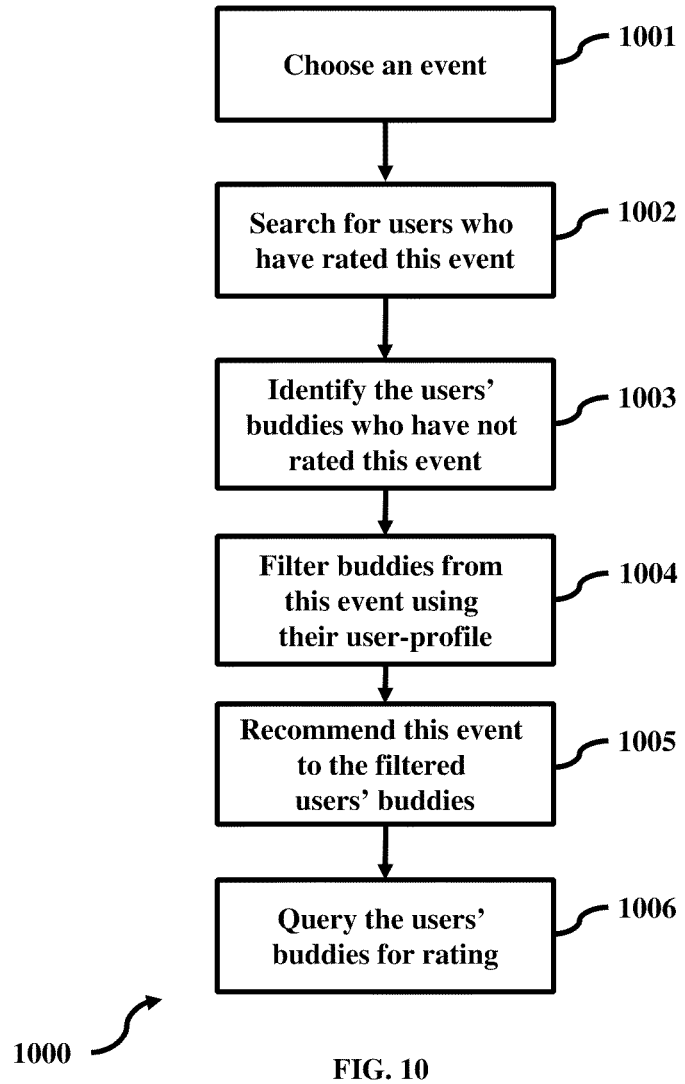
FIG. 10 depicts a flowchart where a user can be selected and queried for rating an event (push-type) by the MSNM, according to embodiments as disclosed herein.

FIG. 10 depicts a flowchart where a user can be selected and queried for rating an event (push-type) by the MSNM, according to embodiments as disclosed herein. The recommender module 202 selects (1001) the event to be rated, hereinafter referred to as event-E. The recommender module 202 selects (1002) the users which have rated event-E. The recommender module 202 identifies (1003) the buddies of these users who have not rated this event. The recommender module 202 filters (1004) the selected buddies using their user-profile and recommends (1005) the buddies selected after the user-profile filter. The recommender module 202 sends (1006) a query (for example using an SMS through SMS gateway 105) to the identified users. The various actions in method 1000 may be performed in the order presented, in a different order or simultaneously. Further, in some embodiments, some actions listed in FIG. 10 may be omitted.

Embodiments disclosed herein enable any mobile user having a mobile-station 101, which has a minimal functionality of writing SMS, to access the proposed mobile social network without installing any additional software on the mobile-station 101. The embodiments herein also enable the access to (approximate) location-based services even if it is provided by the network without requirement of a GPS/GPRS enabled mobile-station.

The embodiments disclosed herein can be implemented through at least one software program running on at least one hardware device and performing network management functions to control the network elements. The network elements shown in FIG. 1 and FIG. 2 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for providing dynamically and autonomously generated targeted recommendations about a social network facilitated event to a user in a social network and in a network compatible with said social network, wherein said social network is accessible from a mobile device in a mobile network, said method comprising providing recommendations about said event to said user based on a plurality of factors, said plurality of factors comprising of at least one among:
   a relationship of said user with a social cluster;
   a relationship of said event with an event cluster;
   a relationship of said social cluster with said event cluster; and
   ratings provided by a plurality of users for a plurality of events in said event cluster, wherein said user may be included in said plurality of users,
   wherein said social cluster is created by performing steps comprising of:
   analyzing feedback and rated events, wherein said rated events are similar to said event, to build a list of users with similar interests in a dynamic manner;
   grouping dynamically said list of users in a dynamic manner into said social cluster; and
   determining a final user rating for said rated events dependent on said social cluster to provide recommendations,
   wherein said social cluster is modified by performing steps comprising of:
   analyzing call detail records of said user, a list of contacts of said user, a profile of said user, a location of said user, said feedback and said rated events, wherein said rated events are similar to said event; and re-grouping said social cluster to provide feedback and ratings for said rated events,
wherein said ratings modify an event cluster, and
wherein analyzing said call detail records comprises:
assigning weights to entries present in said call detail records; and
ranking said entries based on said weights, wherein said weights are assigned based on similarity of users between said user and said entries.

2. The method of claim 1, wherein said mobile device uses Short Messaging Service (SMS) for accessing said social network, and wherein a copy of a SMS sent by a user is stored.

3. The method of claim 1, wherein said event cluster is created by performing steps comprising of:
fetching event attributes of said event;
analyzing said event attributes and rating depending on a social cluster to build a list of events with similar attributes, wherein said event attributes is at least one of keywords, user profile, and location; and
dynamically grouping said list of events into said event clusters.

4. The method of claim 3, wherein said event attributes are fetched dynamically from an event database, wherein said event attributes are entered by at least one of commercial and non-commercial enterprise, and stored in said event database.

5. The method of claim 3, wherein said event attributes comprise of at least one of keywords, suitable user profiles, and location wherein said keywords is used to query for recommendations.

6. The method of claim 1, wherein analyzing rated events further comprises of:
fetching users who have rated events, wherein said rated events are of interest to said user; and
quantifying interest of said users on said social network.

7. The method of claim 1, wherein analyzing list of contacts of said user further comprises of:
checking contacts of said user for contacts who have similar interests as said user; and
quantifying influence of contacts with similar interests on said user.

8. The method of claim 1, wherein providing recommendations to a user further comprises at least one of:
said user providing feedback about said event; and
said user providing ratings for said event.

9. The method of claim 8, wherein said feedback and said ratings are further used to modify said event clusters in relation to said event.

10. The method of claim 9, wherein modifying said event clusters comprises of:
dynamically modifying weights assigned to said event; and
dynamically modifying relationship between said event clusters and said social clusters.

11. A system for providing dynamically and autonomously generated targeted recommendations about a social network facilitated event to a user in a social network and in a network compatible with said social network accessed on at least one hardware device comprising a plurality of modules and a plurality of databases, wherein said social network is accessible from a mobile device in a mobile network, and wherein said system comprises a recommender module running on said at least one hardware device for providing recommendations about said event to said user based on a plurality of factors, said plurality of factors comprising of at least one of:
a relationship of said user with a social cluster;
a relationship of said event with an event cluster;
a relationship of said social cluster with said event cluster; and
ratings provided by a plurality of users for a plurality of events in said event cluster,
wherein said user may be included in said plurality of users;
wherein said at least one hardware device is adapted for creating said social cluster by performing steps comprising of:
analyzing feedback and rated events, wherein said rated events are similar to said event, to build a list of users with similar interests in a dynamic manner;
grouping dynamically said list of users in a dynamic manner into said social cluster; and
determining a final user rating for said rated events dependent on said social cluster to provide recommendations,
wherein said at least one hardware device is adapted for modifying said social cluster by performing steps comprising of:
analyzing call detail records of said user, a list of contacts of said user, a profile of said user, a location of said user, said feedback and said rated events, wherein said rated events are similar to said event;
re-grouping said social cluster to provide feedback and ratings for said rated events; and
determining a final user rating for said rated events dependent on said social cluster to provide recommendations,
wherein said at least one hardware device is adapted for analyzing call detail records by performing steps comprising of:
assigning weights to entries present in said call detail records; and
ranking said entries based on said weights, wherein said weights are assigned based on similarity of users between said user and said entries.

12. The system of claim 11, wherein said mobile device is adapted for using Short Messaging Service (SMS) for accessing said social network, and wherein a copy of a SMS sent by a user is stored.

13. The system of claim 11, wherein said at least one hardware device is adapted for creating said event cluster by performing steps comprising of:
fetching event attributes of said event;
analyzing said event attributes to build a list of events and rating said events depending on a social cluster to build a list of events with similar attributes, wherein said attributes is at least one of keywords, user profile, and location; and
dynamically grouping said list of events into said event clusters.

14. The system of claim 13, wherein said at least one hardware device is adapted for fetching dynamically said event attributes from an event database, wherein said event attributes are entered by at least one of commercial and non-commercial enterprise.

15. The system of claim 11, wherein said at least one hardware device is adapted for analyzing events by performing steps comprising of:
sorting events by rating at least one of timestamps, and alphabets;
fetching users who have rated events, wherein said events are of interest to said user; and
quantifying interest of said users on said social network.

16. The system of claim 11, wherein said at least one hardware device is adapted for analyzing list of contacts of said user by performing steps comprising of:
checking contacts of said user for contacts who have similar interests as said user; and quantifying influence of contacts with similar interests on said user.

17. The system of claim 11, wherein said at least one hardware device is adapted for modifying said event clusters based on feedback and ratings provided by said user.

* * * * *